Aug. 22, 1944.  W. P. LEAR  2,356,253
ELECTRIC MOTOR CONTROL UNIT
Original Filed Dec. 28, 1940   2 Sheets—Sheet 1
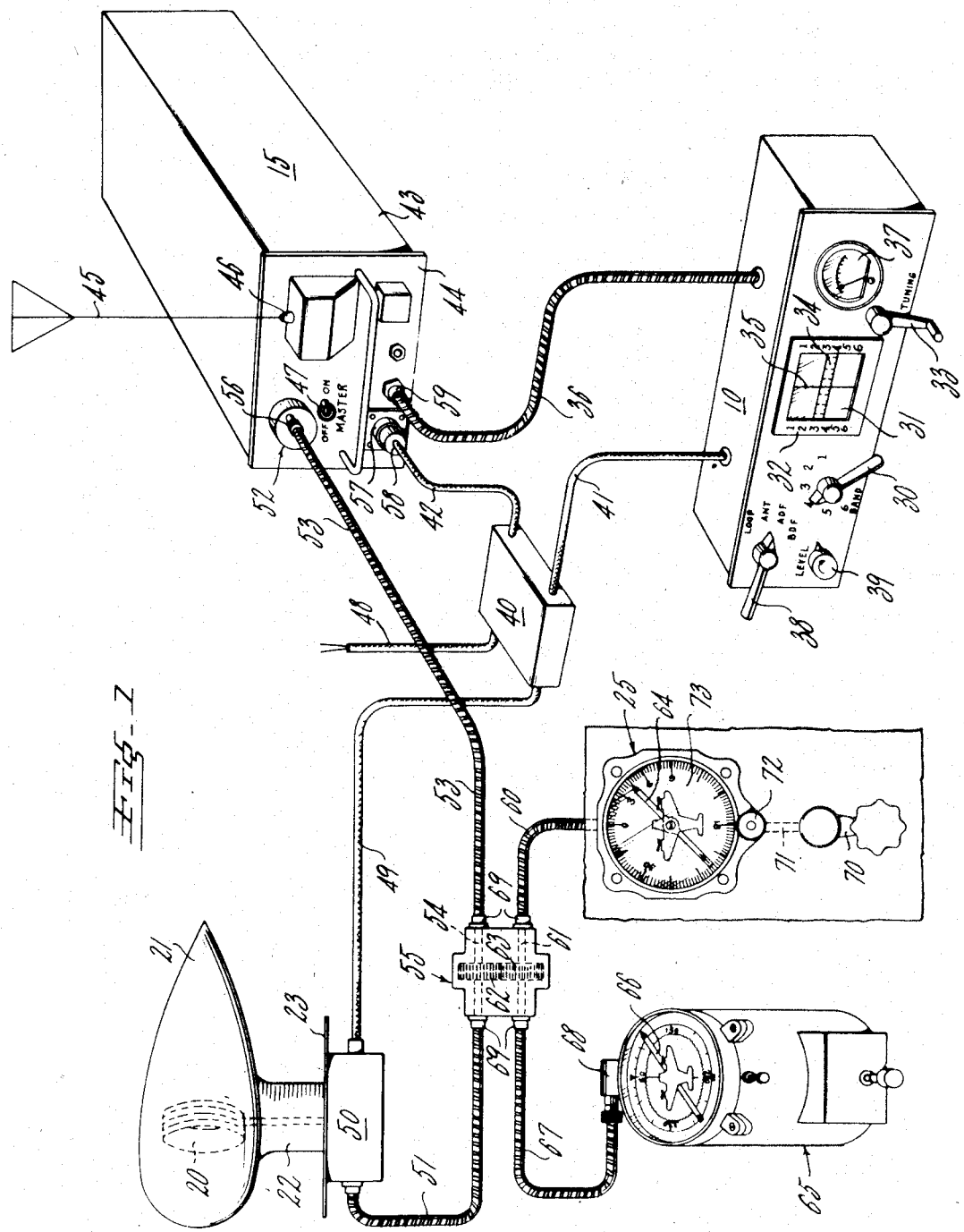
INVENTOR.
*William P. Lear*
BY
*Richard A. Morse*
ATTORNEY Aug. 22, 1944. W. P. LEAR 2,356,253
ELECTRIC MOTOR CONTROL UNIT
Original Filed Dec. 28, 1940 2 Sheets-Sheet 2
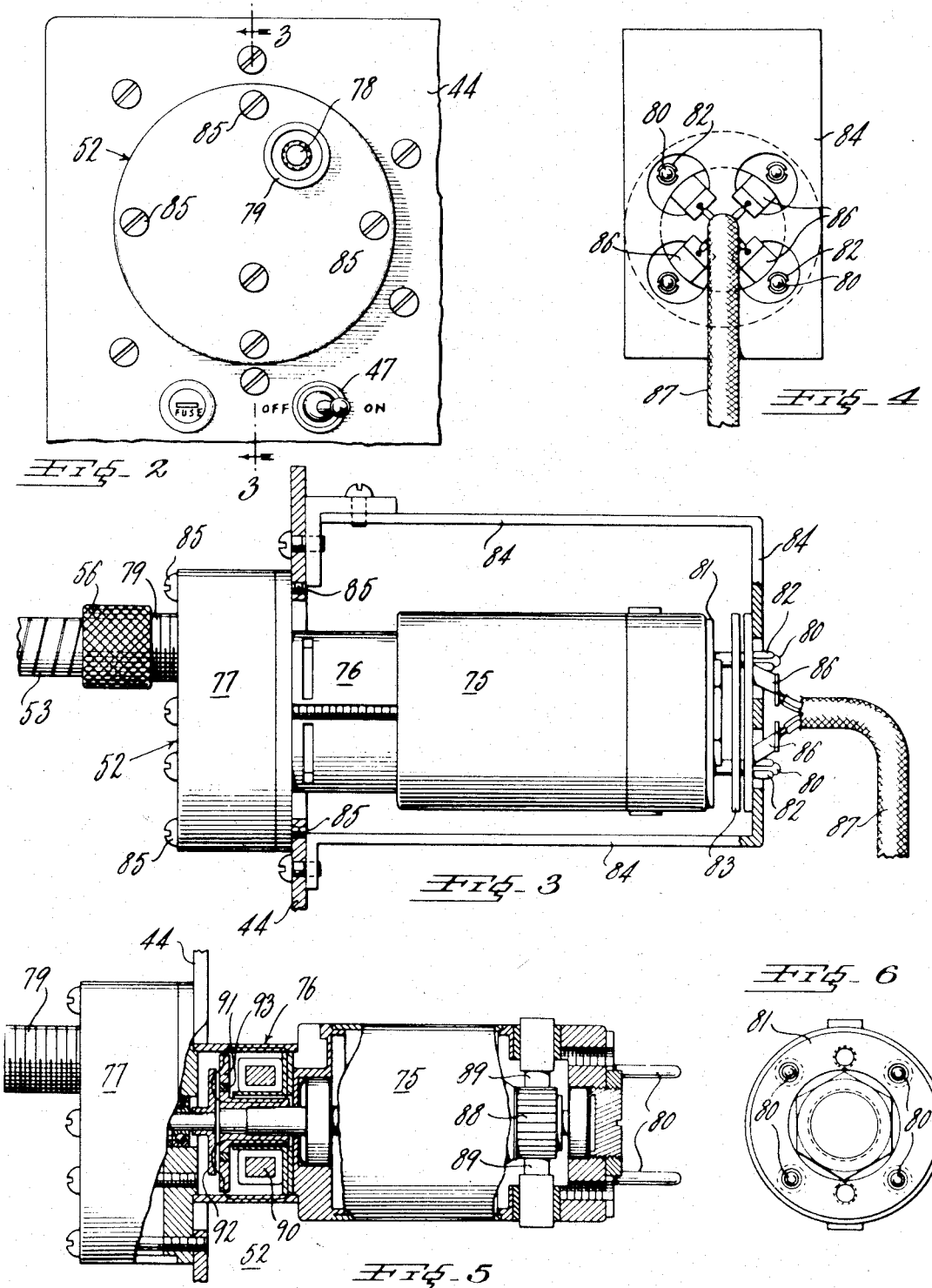
INVENTOR.
William P. Lear
Richard A. Marsen
BY
ATTORNEY Patented Aug. 22, 1944

2,356,253

UNITED STATES PATENT OFFICE 2,356,253

ELECTRIC MOTOR CONTROL UNIT

William P. Lear, Piqua, Ohio, assignor, by mesne assignments, to Lear Avia, Inc., Piqua, Ohio, a corporation of Illinois Original application December 28, 1940, Serial No. 372,059. Divided and this application September 9, 1942, Serial No. 457,693

7 Claims. (Cl. 172—36)

This invention relates to electric motive drives, and more particularly to a self-contained electrical drive assembly that is readily mounted and demounted from an apparatus. The unitary electro-mechanical drive unit of the invention is particularly applicable in remote motor control systems.

It is among the objects of the present invention to provide a novel motor drive assembly incorporating a motor and clutch that are readily electrically and mechanically mounted and demounted in an apparatus.

Another object of the present invention is to provide a novel control motor drive unit incorporating several circuit components, which unit is readily mounted in a stable mechanical relation, and its circuit components simultaneously connected in a predetermined manner to a control circuit.

Still another object of the present invention is to provide a novel motor drive construction that is readily mounted and demounted in relatively inaccessible locations in the apparatus utilizing the motor drive.

A further object of the present invention is to provide a novel plug-in motor construction which greatly simplifies the servicing and maintenance of the motor in the field.

A further object of the present invention is to provide an electric motor having a novel pronged plug-in construction for readily mounting it in stable operative position.

These and other objects, advantages and features of the invention will appear in the following detailed description of a specific embodiment thereof, illustrated in the accompanying drawings, in which:

Fig. 1 is a diagrammatic illustration, in perspective, of a system incorporating the motor drive unit of the invention.

Fig. 2 is a front elevational view of the motor drive unit mounted in the system of Fig. 1.

Fig. 3 is a side elevational view of the motor drive unit mounted in the system.

Fig. 4 is a rear elevational view of the socket and electrical connections for the motor drive unit.

Fig. 5 is a side elevational view, partly in section, of the electric motor drive assembly.

Fig. 6 is an end view of the motor drive of Fig. 5.

In accordance with the invention, the motor drive unit preferably comprises a reversible electrical motor, an electromagnetic clutch coupled thereto, and reduction gearing when required, forming a unitary mechanical drive assembly. The electrical portions of the drive assembly are connected to metallic prongs projecting from one side of the motor base. The drive assembly is mechanically mounted by the projecting prongs in a receiving socket, which stably supports the drive unit in service, and also electrically connects the electrical components of the motor-clutch drive to the exterior control circuit. The present case is a division of my Patent No. 2,317,922 entitled "Directional radio system," which issued April 27, 1943, and assigned to the same assignee as this case.

Fig. 1 illustrates the drive unit of the present invention assembled in an automatic radio directional system. The motor drive unit is herein used as a remote control drive in circuit with an electronic control circuit. A remote control unit 10 is under manual control for operating the directional radio system. Chassis unit 15 contains the radio and electrical control circuits that are responsive to radio signals and also the control drive unit which is indicated at 52. The directional radio system comprises a loop antenna indicated at 20 that is rotatably mounted within streamline housing 21 supported on base 22. The loop antenna assembly is arranged on the body 23 of a vehicle, such as an aircraft. Appropriate circuits for effecting automatic radio directional operation of the system, including a local control circuit for operating the control motor drive unit 52, are disclosed in my Patent No. 2,308,521 entitled "Automatic radio direction indicator," which issued January 19, 1943, and also assigned to the same assignee as this case. An indicator 25 is coupled to the directional system for remotely indicating the bearing position to which control drive unit 52 motivates loop antenna 20.

A band selector switch 30 is provided on control head 10 for adjusting the radio circuits in units 10 and 15 to the desired band of radio frequency operation. Selector switch 30 simultaneously shifts shutter mask 31 of radio tuning indicator 32 in correspondence with the band selected. Tuning knob 33 operates scale 34 to indicate the frequency of the radio station tuned-in opposite stationary index 35. Tuning knob 33 at the same time rotates mechanical cable 36 coupled to the variable radio frequency condenser bank within chassis unit 15 for correspondingly tuning the contained direction finder circuits. A tuning meter 37, in circuit with the radio system, apprises the pilot of the optimum tuning conditions. The mode of circuit operation for the direction finder system is controlled by switch lever 38 of control head 10. The gain level of the system is adjusted by knob 39. The electrical connections between control head 10 and chassis unit 15 comprise junction box 40 and electrical cables 41, 42.

Chassis unit 15 contains a removable metallic casing 43 and front panel 44. A non-directional antenna 45 is connected to terminal 46 on unit 15. A master on-off switch 47 for the direction finder system is arranged on panel 44, remotely from control head 10. The power supply for the system is conducted through cables 42 and 48 via junction box 40. The loop winding 20 is electrically connected to radio circuit unit 15 by a shielded cable 49 through junction box 40 and cable 42. Connection between cable 49 and the rotatable loop antenna is afforded through slip rings, not shown. A quadrantal error corrector unit 50 is coupled between the rotatable loop antenna 20 and mechanical shaft 51 which operates the loop.

Loop drive shaft 51 is directly coupled to the drive unit 52 by flexible shaft 53 and shaft 54 of an H-coupling unit 55. Drive 52 is mounted on panel 44 of chassis unit 15. Shaft 53 is removably coupled to motor drive unit 52 by nipple arrangement 56. Electrical cable 42 is removably coupled to socket 57 on panel 44 through multiple plug 58. Control head shaft 36 is removably coupled to panel 44 by coupling piece 59. Chassis unit 15 may accordingly be readily uncoupled both electrically and mechanically from the remainder of the direction finder system for greatly facilitating its maintenance and servicing in the field.

In accordance with the present invention the drive unit 52 is readily insertable and detachable from the control chassis 15, and is remote from the loop antenna 20 driven thereby. The motor is electrically shielded by housing 43. The cable connections to the motor are short and direct, and wholly within unit 15. No motor circuit connections are required between control unit 15 and the remotely positioned driven loop 20, thereby avoiding interference, as for example with a magnetic compass, or with radio reception. Radiation of clicking and commutator noises is eliminated by such complete local shielding of the motor and its connections.

The loop antenna 20 is directly mechanically driven by drive unit 52 through flexible mechanical shafting 51, 53 joined at H-coupling unit 55. Bearing indicator 25 is mechanically coupled to the mechanical loop drive system by flexible shaft 60 connected with shaft 61 of H-unit 55. Shafts 54 and 61 of H-unit 55 are connected by 1:1 gearing 62, 63. Indicator shaft 60 is accordingly positively related with motor drive shaft 53, following in phase with shaft 51 that controls the angular position of loop antenna 20. Pointer 64 of indicator 25 is directly geared to shaft 60 in the same ratio that the loop antenna 20 is geared to drive shaft 51. The angular relation between loop antenna 20 and needle 64 is initially adjusted so that indicator 25 shows the proper azimuthal bearing positions of the loop. The quadrantal error corrector unit 50 automatically compensates the bearing indications for extraneous radio distortions, in a manner well known in the art.

A second indicator unit 65 contains radio bearing index 66. Index 66 is connected to H-coupling unit 55 through mechanical shaft 67 and connections 68, 69. The 360° quadrantal error corrector 50 provided between loop antenna 20 and the plurality of bearing indicators and motor drive unit 52 affords the accurate azimuthal bearing indications at a plurality of positions on the aircraft. The indicators are thus individually interchangeable or removable, without affecting the operation of the remaining indicators. Coupling nipples 69 of H-unit 55 permit the convenient addition of an indicator if only one has been installed. Furthermore, when remote motor drive unit 52 is dissembled for servicing, the several indicators, 25 and 65, remain in in-phase relation with the loop antenna 20 and corrector 50, and need not be tested or readjusted after the servicing.

A manual loop drive crank 70 is mechanically connected to indicator 25 and its drive shaft 60 through the connection 71 indicated in dotted lines. In the event that manual direction finding operation is indicated in flight, such as when the electric motor control unit 52 is disconnected or inoperative, direct drive of loop 20 and the associated radio indices 64 and 66 is effected through crank 70. Aural or visual null signal reception is then used with the system. Crank 70 is normally unclutched from connection 71 to prevent its rotation during automatic directional operation. An adjusting knob 72 is coupled to bearing scale 73 for displacing it from its indicated "zero" position whenever desired during navigation.

In accordance with the present invention, the control motor drive unit 52 is mounted for ready removal from chassis panel 44. Figs. 2 and 3 show details of its construction. Motor control unit 52 comprises a reversible electric motor 75, an electromagnetic clutch unit 76 and a reduction gearing unit 77, forming a mechanically inter-connected integral device. Mechanical cable 53 is detachably connected thereto through fluted output shaft 78, being held in position by nipple 56 threaded onto threaded projecting tube 79. Metallic prongs 80 project from insulated base 81 at the end of motor 75, and engage with split metallic receptacle members 82 of socket 83. Socket 83 is attached to supporting frame 84 extending from panel 44.

The mounting of motor drive assembly unit 52 is secured merely by screws 85 extending through gear unit 77 and engaging with panel 44. The rear of drive assembly 52 is mechanically supported by the four projecting prongs 80 engaged with socket 83. By loosening screws 85, unit 52 including integrally connected motor 75, clutch 76 and gearing 77, is slipped off panel 44. The electrical connections to the motor 75 and clutch 76 are made through prongs 80 to electrical cable 87 via socket 83 including its spring contact members 82 and connecting lugs 86, as shown in Figs. 3 and 4. Electrical cable 87 and socket 83 remain stationary within the chassis and with respect to internal supporting frame 84. The motor 75 and clutch 76 are accordingly readily electrically disconnected from the circuit when uncoupled in the manner herein set forth, and conversely are readily mounted in position in their predetermined circuital relation.

Figs. 5 and 6 show further details, in cross-section, of motor drive unit 52. The illustrated motor 75 is of the reversible direct current type such as used in the automatic direction finder circuit disclosed in Patent No. 2,308,521 referred to above. It is to be understood, however, that a different type electric motor, such as an alternating current one, may instead be used, and that the motor drive assembly of the invention may be applied to other uses. Motor 75 has a commutator 88 and brushes 89. Suitable electric connections are made between the several projecting prongs 80 and the brushes and field coils of the motor, and energizing winding 90 of electromagnetic clutch 76. Such circuital arrangements for motor 75 and clutch 76 are shown in my Patent No. 2,308,521, and in my Patent No. 2,267,114 of December 23, 1941, entitled "Electromagnetic clutch." The typical electrical cable connections to the motor and clutch components therein shown are replaced by the prongs 80 of the present invention. Prongs 80 afford the electrical connection for motor 75 and clutch 76 with the electrical control circuits therefor, via cable 87. The prongs 80 also afford mechanical support for the motor drive assembly 52, in the manner hereinbefore described, particularly in connection with Figs. 2 and 3.

The electromagnetic clutch 76 may be of any desired construction; the illustrated arrangement corresponding to that shown in my Patent No. 2,267,114. The clutch 76 comprises a winding 90 which generates magnetic flux through drive disk 91 and driven disk 92 about a non-magnetic region 93. Abrupt starting and stopping of the low inertia driven disk 92 is effected by such arrangement, resulting in accurate positioning control by the motor drive unit. The ready mechanical and electrical mounting and demounting feature of the motor drive unit of the invention greatly enhances its usefulness in service. The projecting prongs 80 of the motor drive unit 52 preferably are mechanically designed and so arranged with respect to the receiving socket and receptacles 82 as to predetermine their engagement and insure the correct circuital connection of the drive unit with the control circuits. Such predetermined engagement is effected as by eccentric spacing of the prongs 80 and associated receptacles 82 or by having prongs of different diameters, or both.

Although a preferred arrangement of the invention has been described and illustrated, it is of course subject to variation and modification in practice as will be understood by those skilled in the art. It accordingly is not intended to limit the spirit and scope of the invention, except as set forth in the following claims.

What I claim is:

1. An electric motor control unit comprising a body for the motor containing the field windings thereof, an armature rotatably supported within said body in cooperative relation with said field windings, prongs projecting from said motor body, said prongs being electrically connected to said field windings and armature in a predetermined relation, and a socket containing individual conducting spring elements for removably engaging said prongs to mechanically support the motor control unit and properly connect it to a control circuit.

2. An electric motor control unit comprising a body for the motor containing the stator thereof, a rotor rotatably supported within said stator in cooperative relation with said stator, an electromagnetic clutch secured to one end of said motor body and coupled to said rotor, a plurality of prongs projecting from the opposite end of said motor body, said prongs being electrically connected to the circuit components of the motor and clutch in a predetermined relation, whereby the motor unit is mechanically supported in position by plugging of said prongs into a socket and thereby simultaneously placed in proper electrical circuital relation with a control circuit.

3. An electric motor control unit comprising a body for the motor containing the field windings thereof, a rotor rotatably supported within said body in cooperative relation with said field windings, an electromagnetic clutch coupled to said rotor, a plurality of metallic members projecting from said motor body and being insulated therefrom, said members being electrically connected to said field windings and clutch in a predetermined relation, and a socket containing individual conducting receptacles for removably engaging said members to mechanically support the motor control unit and properly connect it to a control circuit.

4. An electric motor control unit comprising a body for the motor containing reversible field windings, an armature rotatably supported within said body in cooperative relation with said field windings, an electromagnetic clutch secured to one end of said motor body and coupled to said armature, a plurality of prongs projecting from the opposite end of said motor body and being insulated therefrom, said prongs being electrically connected to said field windings, armature and clutch in a predetermined relation, whereby the motor unit is mechanically supported in position by plugging of said prongs into a socket and thereby simultaneously placed in proper electrical circuital relation with a control circuit.

5. An electric motor control unit comprising a body for the motor containing the stator thereof, a rotor rotatably supported within said body, an electromagnetic clutch secured to said motor body and coupled to said rotor, a plurality of prongs projecting from said motor body, said prongs being electrically connected to the circuit components of the motor and clutch in a predetermined relation, whereby the motor unit is mechanically supported in position by plugging of said prongs into a socket and thereby simultaneously placed in proper electrical circuital relation with a control circuit, and a coupling piece for detachably connecting a shaft to the output of said clutch.

6. An electric motor drive unit comprising a body for the motor containing the field windings thereof, a reduction gearing unit secured to said body, a rotor rotatably supported within said body in cooperative relation with said field windings, an electromagnetic clutch having a driving member coupled to said rotor and a driven member coupled to said reduction gearing, a plurality of metallic members projecting from said motor body and being insulated therefrom, said members being electrically connected to said field windings, rotor and clutch in a predetermined relation, and a socket containing individual conducting receptacles for removably engaging said members to mechanically support the motor driving unit and properly connect it to a control circuit.

7. An electric motor drive unit comprising a body for the motor containing the field windings thereof, a reduction gearing unit secured to one end of said body, a rotor rotatably supported within said body in cooperative relation with said field windings, an electromagnetic clutch having a driving member coupled to said rotor and a driven member coupled to said reduction gearing, a plurality of metallic members projecting from the other end of said motor body and being insulated therefrom, said members being electrically connected to said field windings, rotor and clutch in a predetermined relation, a socket containing individual conducting receptacles for removably engaging said members to mechanically support the motor driving unit at such other end and properly connect it to a control circuit, and fastening means for securing the reduction gearing unit to a support to mechanically support the motor driving unit at such one end thereof.

WILLIAM P. LEAR.